United States Patent [19]
Holcomb

[11] Patent Number: 4,852,616
[45] Date of Patent: Aug. 1, 1989

[54] CORRUGATED PIPE

[75] Inventor: Richard A. Holcomb, East Point, Ga.

[73] Assignee: Mid-State Drainage Products, Inc., Stockbridge, Ga.

[21] Appl. No.: 29,390

[22] Filed: Mar. 23, 1987

Related U.S. Application Data

[63] Continuation of Ser. No. 818,429, Jan. 10, 1986.

[51] Int. Cl.$^4$ .............................................. F16L 9/02
[52] U.S. Cl. .................................... 138/173; 138/121; 138/122; 138/135; 138/154
[58] Field of Search ............... 138/173, 121, 122, 154, 138/129, 134, 135; 228/17.7, 145

[56] References Cited

U.S. PATENT DOCUMENTS

| | | |
|---|---|---|
| T103,901 | 2/1984 | Lapke et al. |
| 365,630 | 6/1887 | Pratt |
| 1,057,505 | 4/1913 | Smith ................................. 138/173 |
| 1,259,233 | 3/1918 | Hartman |
| 1,263,340 | 4/1918 | Silk |
| 1,270,579 | 6/1918 | Witzenmann ..................... 138/122 |
| 2,852,597 | 9/1958 | Raydt et al. ...................... 138/122 |
| 2,934,466 | 4/1960 | Molla ................................. 138/173 |
| 3,094,147 | 4/1961 | Nemer |
| 3,224,814 | 12/1965 | Fisher ................................ 138/122 |
| 3,263,321 | 8/1966 | Lombardi .......................... 228/17.7 |
| 3,731,711 | 5/1973 | Bauer ................................. 138/173 |
| 3,913,623 | 10/1975 | Siegwart ........................... 138/122 |
| 4,562,733 | 1/1986 | Kant .................................. 138/122 |

FOREIGN PATENT DOCUMENTS

| | | | |
|---|---|---|---|
| 217131 | 7/1959 | Austria ............................... | 138/122 |
| 522825 | 10/1953 | Belgium ............................. | 138/122 |
| 237250 | 1/1909 | Fed. Rep. of Germany ...... | 138/122 |
| 2156579 | 5/1973 | Fed. Rep. of Germany ...... | 138/122 |
| 4806 | of 1891 | United Kingdom ............... | 138/173 |
| 2285 | of 1899 | United Kingdom ............... | 138/173 |
| 0024984 | of 1900 | United Kingdom ............... | 138/173 |
| 6093 | of 1901 | United Kingdom ............... | 138/173 |
| 2610 | of 1904 | United Kingdom ............... | 138/173 |
| 409991 | 9/1933 | United Kingdom ............... | 138/122 |

OTHER PUBLICATIONS

Handbook of Steel Drainage & Highway Construction Products, Published by American Iron and Steel Institute, 1983.

*Primary Examiner*—James E. Bryant, III
*Attorney, Agent, or Firm*—Irvin A. Lavine

[57] ABSTRACT

A spirally wound corrugated pipe of sheet steel or the like is provided with outwardly convex corrugations which are spaced apart, with a flat portion of single wall thickness between adjacent corrugations. In one embodiment, the corrugation have a pitch of five inches and a height of one-half inch; in another embodiment, the pitch is six inches and the height is one inch.

12 Claims, 1 Drawing Sheet

U.S. Patent    Aug. 1, 1989    4,852,616
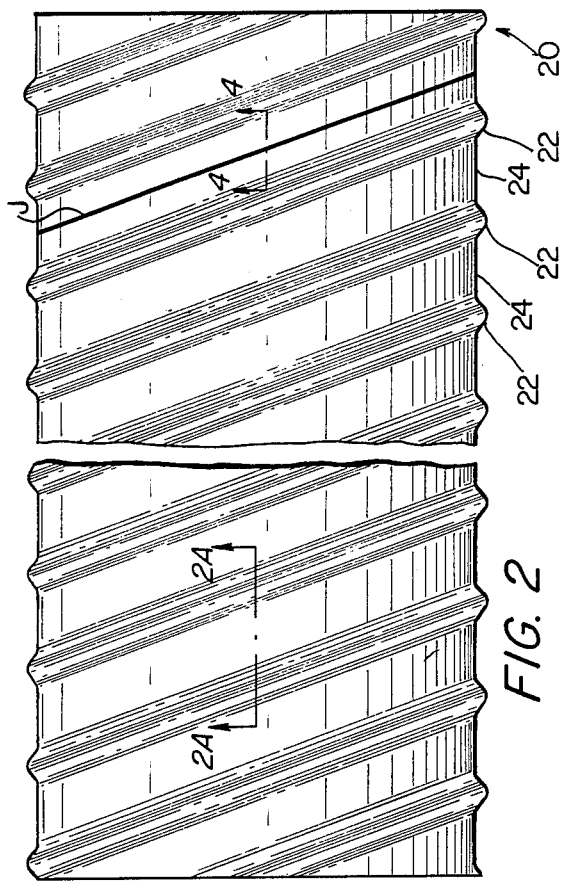
FIG. 2
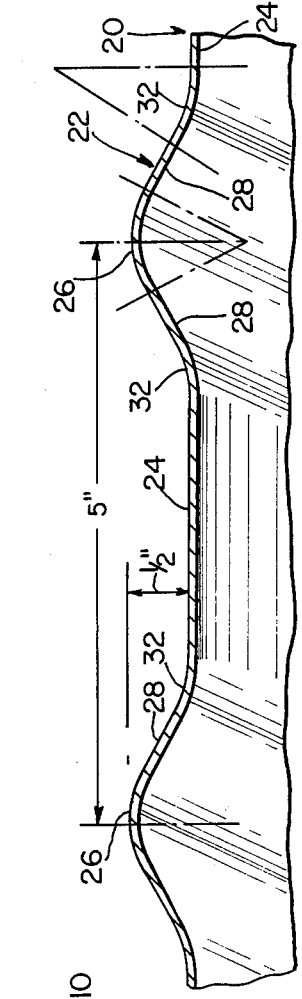
FIG. 2A
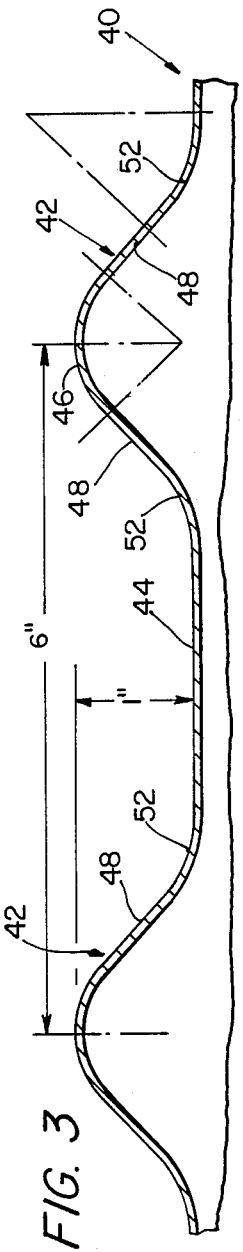
FIG. 4
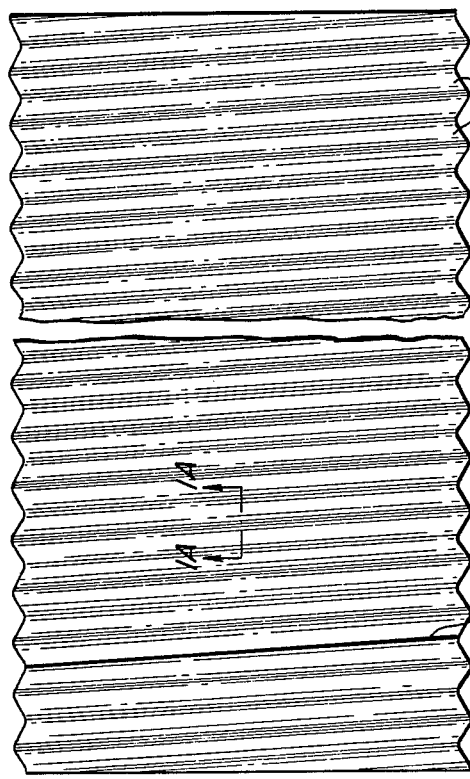
FIG. 1
PRIOR ART
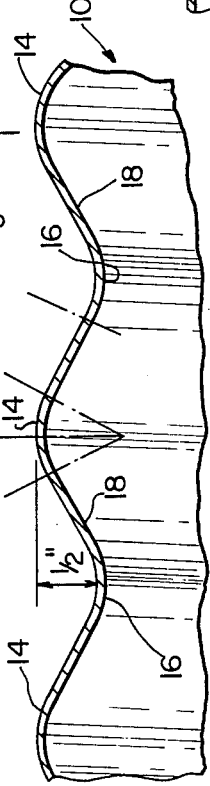
FIG. 1A
PRIOR ART
FIG. 3

CORRUGATED PIPE

This application is a continuation, of application Ser. No. 818,429, filed Jan. 10, 1986, now abandoned.

BACKGROUND OF THE INVENTION

The present invention relates to a pipe of sheet steel or the like, fabricated of a single strip of metal, and which is provided with spirally extending corrugations.

It has long been recognized that pipes such as are used for conduits, drainage and the like are subject to substantial compressive loads, and that they have greater strength if they are corrugated, instead of being of purely cylindrical construction. For example, Pratt et al. U.S. Pat. No. 365,630 discloses the provision of a tube of a suitable metal which is corrugated spirally with a single rib and which extends from one end of the tube to the other. The tube is produced by placing a plain tube upon a spirally corrugated mandrel, which is placed between the centers of a lathe, and a roll of angular corrugations is then forced into the tube, so as to cause it to take the form of the corrugated mandrel. This corrugated tubing had an exterior sinusoidal profile formed by convex portions connected directly to concave portions. Such tubing is disclosed as being used in connection with boilers, radiators, and the like.

Silk U.S. Pat. No. 1,263,340 discloses a spiral sheet metal pipe which is intended to be used for culverts, sewers, and the like, being formed with continuous spirally extending corrugations, with an upstanding spiral seam provided by flanges extending outwardly from the pipe. The disclosed pipe is formed of a single strip of sheet metal which is wound or coiled into spiral form, and having the lateral edges interlocked by the above noted outstanding flange and seam construction. It has a sinusoidal profile.

Hartman U.S. Pat. No. 1,259,233 provides a drain pipe of sheet metal, for roadways, gutters, and the like, made of a strip having circular corrugations, and which is formed into a circle and welded in the circular form, with plural strips being axially joined. The disclosed pipe has a sinusoidal profile.

Nemer U.S. Pat. No. 3,094,147 provides helically wound strip material formed into bendable tubing, useful, for example, as part of an automobile exhaust system. The edges of the strip of which the tubing is formed with rolled edges which are joined into a four-thickness locked seam. The profile is sinusoidal, interspersed with flat portions formed at the four-thickness seams.

Lupke et al. Defensive Publication T103,901 discloses a stiff thin walled plastic pipe of thermoplastic material, the longitudinal cross section profile of the wall comprising a wave form.

Spirally wound steel pipe is widely used for culverts, storm sewers, subdrains, spillways, underpasses and service tunnels. According to Handbook of Steel Drainage and Highway Construction Products, published by American Iron and Steel Institute (Second Edition, 1971), round or circular corrugated steel conduits are in common use for such purposes for medium and high fills, or trenches, and range in diameter from six inches to 21 feet. The corrugations are stated to be "circular arcs connected by tangents" and are described by pitch, depth and inside forming radius. Riveted and resistance spot-welded pipe are noted, having circumferential seams, with the corrugations being of two and two-thirds inch pitch by one and one-half inch depth and three inch pitch by one inch depth. There is also noted lock seam pipes, with the seams and corrugations running helically (or spirally) around the pipe. Small diameters of six, eight, ten inches, etc., have a pitch of one and one-half inches by one-quarter inch depth, while larger sizes, with diameters up to twelve feet, have a two inch pitch by one-half inch depth, two and two-thirds inch pitch by one and one-half inch depth and three inch pitch by one inch depth. Tables are provided for the configurations of the various pipes, with the pipes being of convex and concave circular arcs connected by inclined flat tangential portions. This publication provides tables setting forth the maximum cover of fill material for corrugated steel pipe, taking into account pipe diameter and thickness of the sheet steel material of which the corrugated pipe is made. For example, Table HC-1 provides that with a corrugated pipe having a two and two-thirds inch pitch and one-half inch depth corrugations, for an H 20 Live Load, where the pipe diameter is eighteen inches, and the pipe wall thickness is 0.052 inches, the maximum cover is 132 feet. With other factors being the same, and the thickness increased to 0.079 inches, the maximum cover is 207 feet. With the use of these tables, engineers designing culverts, drain pipes, etc., are able to determine the required size of pipe, based upon such variable factors as the type of load, depth of fill, and type of soil.

As indicated by the above noted Handbook, the corrugated steel pipe which has been produced has been engineered for the maximum fill which pipe of a particular configuration is capable of safely supporting. To this end, the thickness and the shapes of the corrugations have been standardized, the corrugations having, as above noted, circular arcs connected by tangents which were inclined. Such pipes have been sufficiently strong to sustain the design loads as set forth in the above noted Handbook.

Consequently, an engineer, under present practices, has a limited number of available pipe sizes and dimensions. For example, where the engineer is to specify a corrugated steel pipe for an H 20 Live Load, the pipe having an eighteen inch diameter, such pipe is available in thicknesses of 0.052 inches, 0.064 inches, and 0.079 inches, which are specified for maximum cover in feet of 132 feet, 166 feet and 207 feet, respectively. If the engineer is faced with a project which requires such an eighteen inch diameter corrugated steel pipe, with a rated H 20 Live Load, and he is aware that his maximum cover will be, for example, 30 feet, then he is faced with specifying a pipe having a capability of withstanding more than four times the actual cover of that project. Nevertheless, there is available only a very substantial over-strength pipe for the particular requirement, and therefore the engineer is forced to specify an unnecessarily expensive product.

While the above noted publication refers to lock seam pipe, with helical corrugations, and to resistance spot-welded pipe with circumferential seams, there has recently been introduced equipment for producing spiral wound butt-welded pipes. This equipment is manufactured by Armco Steel Company. By avoiding the rolled edges which produce a lock seam, and utilizing the butt-welded seam, a reduction of metal cost of approximately five percent is achieved. The equipment required to produce the butt-welded seam of the corrugated helical steel pipe is expensive, and therefore, although there is a saving in direct metal cost, there is a substantial addition in overall cost due to the noted welding equipment.

SUMMARY OF THE INVENTION

A corrugated spiral pipe of strong material, such as steel sheet, has spaced, spirally extending corrugations. Between the corrugations are flat portions, which are closer to the axis of the pipe than are the crests of the corrugations. Each corrugation comprises a circular arc, and an inclined tangential portion, the tangential portions each being connected by a concave circular arc with a flat portion which lies closer to the axis of the pipe than the crests of the corrugations.

In preferred embodiments, the pitch between corrugations may be five inches, with a depth of one-half inch. In an alternate embodiment, the pitch may be six inches, with a depth of one inch.

Preferably, the edges of the strip which is corrugated to form the corrugated pipe of the present invention are folded over, so as to provide a lock seam. However, if desired the edges may be secured by other techniques, including butt-welding.

Among the objects of the present invention is the provision of corrugated pipe which will utilize less material than is required for the production of known pipes of the same thickness, diameter and length; another object of the present invention being the provision of corrugated steel pipe which can be fabricated at a significantly lower cost than the pipe now made, and which is of comparable thickness, diameter and size.

Other objects and many of the attendant advantages of the present invention will be readily understood from a consideration of the following specifications, claims and drawings.

BRIEF DESCRIPTION OF THE DRAWINGS

FIG. 1 is an elevational view, with parts broken away, of a conventional corrugated steel pipe.

FIG. 1A is an enlarged cross-sectional view taken on the line 1A—1A of FIG. 1.

FIG. 2 is an elevational view, with parts broken away, of a corrugated pipe in accordance with the present invention.

FIG. 2A is a cross-sectional view taken on the line 2A—2A of FIG. 2.

FIG. 3 is a cross-sectional view similar to FIG. 2A, and showing an alternate embodiment of a corrugated pipe in accordance with the present invention.

FIG. 4 is a cross-sectional view taken on the line 4—4 of FIG. 2.

DESCRIPTION OF THE PREFERRED EMBODIMENTS

Referring now to the drawings, wherein like or corresponding reference numerals are used for like or corresponding parts throughout the several views, there is shown in FIG. 1A a prior art corrugated pipe designated 10, and being provided with helically extending corrugations 12. In practice, a single sheet of steel of the desired width and thickness is subjected to a plurality of corrugating rollers, which provide a plurality of corrugations across the width of the steel sheet, and then the corrugated steel strip is helically formed, with provision for joining of the edges at helical joints J so as to form a continuous pipe. As above noted, the joining of the edges may be either by rolling the edges, so as to provide the structure for the formation of a lock seam, or the edges may be butt-welded. The length of pipe 10 which is produced is limited only by the length of the original steel strip stock material, the handling facilities of the production plant, and transportation equipment. In practice, a saw is provided to saw the completed pipe into suitable lengths for handling and transportation.

FIG. 1A shows the shape of the wall of the corrugated pipe 10. This illustrates the standard shape of the corrugations, known as "circular arcs connected by tangents". Here, there are convex circular arcs 14, the arcs 14 being arranged in a spaced series. There are also provided concave circular arcs 16 intermediate the convex circular arcs 14. Intermediate adjacent circular arcs 14 and 16 there are inclined flat tangent portions 18, these being tangent to both the convex circular arcs 14 and concave circular arcs 16.

The depth of the corrugations of the typical prior art corrugated spiral pipe 10 is measured from the bottom of the concave circular arc 16 to the top of the convex circular arc 14, and is one-half inch in the pipe 10. The pitch of the corrugations of the pipe 10 is two and two-thirds inches, as measured at right angles to the corrugations from crest to crest.

Referring now to FIG. 2, there is shown a helically wound corrugated pipe 20 in accordance with the present invention. Pipe 20 is produced by equipment similar to that described in connection with the production of pipe 10 of FIG. 1A, except that the rolls or dies include not only dies for forming corrugations, but dies for maintaining portions of the stock steel strip in flat condition. Thus, there will be seen helical corrugations 22, and between them there are flat portions 24. Helical joints J join the edges of adjacent strips to form the pipe 20. It will be noted, further, that while the thickness of the sheet steel of the pipe 20 in accordance with the present invention may be of standard thicknesses as used in the art to produce conventional pipe 10, and while the diameters of pipes 20 may be the same as the diameters of conventional pipe 10, the angle of the corrugations 22 relative to a plane normal to the axis of the pipe 20 may be significantly different from i.e., greater than, as shown the angles of the corrugations 12. The angles of the corrugations for pipes 20 of various diameters are given as follows:

TABLE A

| PIPE DIAMETER (Inches) | ANGLE (Degrees) |
| --- | --- |
| 12 | 38 |
| 15 | 30 |
| 18 | 25 |
| 21 | 20 |
| 24 | 19 |
| 30 | 14 |
| 36 | 13 |
| 42 | 10 |
| 48 | 9 |
| 54 | 8 |
| 60 | 7 |

Referring now to FIG. 2A, the corrugation 22 of pipe 20, as viewed from the exterior thereof comprises a convex circular arc 26, on either side of which is an inclined flat tangent portion 28. Each corrugation 22 subtends an angle of less than 180° an angle of less than 90° being shown in FIG. 2A. Adjacent each of the inclined flat tangential portions 28 is a concave circular arc portion 32 which is tangent to both the inclined flat portion 28 and the horizontal flat portion 24. There is thereby provided a smooth transition of the sheet steel from each horizontal flat portion 24 to the adjacent corrugations 22.

The horizontal flat portion 24 has substantial length, or distance between adjacent concave arc portions 32. The corrugation 22, concave arc portion 32 and horizontal flat portion 24 are located sequentially along the axis of pipe 20. The pitch of the pipe 20, as measured perpendicularly between crests of successive corrugations 22, is five inches, and the depth is one-half inch, as measured from the crest of a corrugation 22 to the flat portion 24.

A pipe 20 in accordance with the present invention may be made with a reduction in cost of sheet steel stock, and using standard lock seams, which is approximately six and one-half percent less than a pipe 10, based on equal thicknesses, diameters and lengths of the pipes. This results in an overall cost reduction of a pipe 20 of approximately fourteen percent, in comparison with the pipe 10 of the same wall thickness, length and diameter.

Referring now to FIG. 3, there is shown a pipe 40 in accordance with the present invention, comprising helical corrugations 42, having the same general characteristics as corrugations 22; that is, there is provided a convex circular arc portion 46, a pair of inclined flat portions 48 tangential thereto, a pair of concave circular arc portions 52, and flat portions 44 between arc portions 52. As shown, the corrugations 42 subtend an angle of approximately 90°. The pitch between corrugations 42 of the pipe 40 shown on FIG. 3 is six inches, and the depth of the corrugations, measured from the flat portion 44 to the crest of the corrugations 42 is one inch. As is apparent, the pipes 20 and 40 have in longitudinal cross-section repeated successions of flat portions and corrugations, the helically extending and longitudinally spaced corrugations 22 and 42 having flat portions 24 and 44 intermediate the corrugations 22 and 42. The flat portions 24 and 44 are parallel to the axis of the pipe 20, 40, respectively. As is apparent from FIGS. 2A and 3, the crest of the corrugations 22 and 42 are at a greater radius than are the flat portions 24 and 44, respectively.

The angle of the corrugations of the pipe 40, relative to a plane normal to the axis of pipe 30 are those set forth in the following table:

TABLE B

| PIPE DIAMETER (Inches) | ANGLE (Degrees) |
| --- | --- |
| 48 | 7 |
| 54 | 6 |
| 60 | 6 |
| 66 | 5 |
| 72 | 5 |
| 78 | 4 |
| 84 | 4 |
| 90 | 4 |
| 96 | 3 |
| 102 | 3 |
| 108 | 3 |

The pipes 20 and 40 are illustrative of pipes made in accordance with the present invention. The herein disclosed pipes are significantly less expensive than are standard pipes currently manufactured, as exemplified in the above noted Handbook of Steel Drainage & Highway Construction Products. The pipes in accordance with the present invention are entirely suitable for many installations, particularly where the anticipated fill height and load factors, which exert compressive loads on the pipe, are significantly less than the maximum for which the standard corrugated steel pipes are suitable.

The claims and the specification describe the invention herein presented and the terms that are employed in the claims draw their meaning from the use of such terms in the specification. Some terms employed in the prior art may be broader in meaning than specifically employed herein. Whenever there is a question between the broader definition of such terms as used in the prior art and the more specific use of the terms herein, the more specific meaning is meant.

It will be obvious to those skilled in the art that various changes may be made in the herein disclosed apparatus. However, the invention is not limited to what is set forth in the specification or described in the drawing, but only as defined in the claims attended hereto.

I claim:

1. In a pipe adapted to be used in the ground as a culvert, the improvement comprising:
    (a) said pipe formed of a strip of material of uniform thickness which enables the pipe to withstand compressive loads experienced by culverts in the ground,
    (b) means for helically joining together adjacent edges of said strip to form said pipe,
    (c) the pipe being of single thickness of material between said helical joint means,
    (d) the pipe having helically extending longitudinally spaced corrugations of equal diameters, and a flat portion between adjacent corrugations,
    (e) said flat portions being cylindrical and of equal diameter,
    (f) the material of said flat portions and said corrugations having substantially the same thickness,
    (g) said corrugations each comprising as viewed from the exterior of the pipe, a convex portion having an arcuate crest in longitudinal cross-section at a greater radius from the pipe axis than said flat portion, said convex portion subtending an angle of less than 180°,
    (h) means for providing a smooth transition of said material being each said flat portion and the adjacent corrugations comprising, as viewed from the exterior of the pipe, a concave portion at the edge of said flat portion and tangent thereto, said concave portions each joined to a said convex portion,
    (i) said corrugations, said concave portions adjacent thereto, and said flat portions being located sequentially along the axis of the pipe, and
    (j) said corrugations being the only protuberances of said pipe between said helical joint means.

2. In a pipe adapted to be used in the ground as a culvert, said pipe being of sheet material of uniform thickness and substantial strength which enables the pipe to withstand compressive loads experienced by culverts in the ground,
    said pipe being cylindrical and of a helically wound strip of said sheet material having helical joints,
    said pipe having helically extending longitudinally spaced corrugations, substantially all of which are of single wall thickness, said corrugations being of uniform diameter and each subtending an angle of less than 180°,
    flat portions intermediate said corrugations and parallel to the axis of said pipe, substantially all of said flat portions being of single wall thickness and uniform diameter, said corrugations each being convex as viewed from the exterior of the pipe and with an arcuate crest in longitudinal cross-section at a greater radius from the axis of the pipe than said flat portions, spaced portions concave as viewed from the exterior of said pipe, each tangent to a said flat portion at one end, and flat portions inclined relative to the pipe axis intermediate said convex corrugations and said concave portions and tangent thereto, said corrugations, said concave portions adjacent thereto, and said flat portions being located sequentially along the axis of the pipe, said pipe being of uniform thickness between joints, the thickness and material of said pipe enabling said pipe to withstand compressive loads experienced by culverts in the ground.

3. The pipe of claim 2, the corrugations having a pitch of approximately five inches and having a height above said intermediate flat portions of approximately one-half inch.

4. The pipe of claim 3, the angle of the corrugations and pipe diameter being as set forth in Table A hereof.

5. The pipe of claim 2, the corrugations having a pitch of approximately six inches and having a height above said intermediate flat portions of approximately one inch.

6. The pipe of claim 3, the angle of the corrugations and pipe diameter being as set forth in Table B hereof.

7. In a pipe to be used in the ground as a culvert, the improvement comprising:

said pipe being cylindrical, and formed of a strip of material of uniform thickness which enables the pipe to withstand compressive loads experienced by culverts in the ground, the strip of material being helical and having joints at the edges of the strip, the pipe being of single thickness of material being the joints, the pipe having helically extending longitudinally spaced corrugations of equal diameter, convex as viewed from the exterior of the pipe, said corrugations each being arcuate and subtending an angle of less than 180°, intermediate flat portions of substantially equal diameter less than the diameter of said corrugations between said corrugations, the material of said intermediate flat portions and said corrugations having substantially the same thickness, means for providing a smooth transition between a said corrugation and adjacent intermediate flat portions comprising a pair of spaced portions, concave as viewed from the exterior of said pipe, each said concave portion being tangent to a said intermediate flat portion and joined to said convex corrugation, said convex corrugations each having an arcuate crest at a greater radius from the axis of the pipe than said intermediate flat portions, said corrugations being the only protuberances of said pipe between said joints, said corrugations, said concave portions adjacent thereto, and said intermediate flat portions being located sequentially along the axis of the pipe.

8. The pipe of claim 7, said pipe further comprising flat portions inclined relative to the pipe axis and each tangent to a said concave portion and to said convex corrugation.

9. The pipe of claim 7, the corrugations having a pitch of approximately five inches and having a height above said intermediate flat portions of approximately one-half inch.

10. The pipe of claim 9, the angle of the corrugations and pipe diameter being as set forth in Table A hereof.

11. The pipe of claim 7, the corrugations having a pitch of approximately six inches and having a height above said intermediate flat portions of approximately one inch.

12. The pipe of claim 11, the angle of the corrugations and pipe diameter being as set forth in Table F hereof.

* * * * *